US009508159B2

(12) United States Patent
Kim et al.

(10) Patent No.: US 9,508,159 B2
(45) Date of Patent: Nov. 29, 2016

(54) IMAGE DATABASE CONSTRUCTING METHOD AND DEVICE USING THE SAME

(71) Applicant: KAKAO CORP., Jeju-Si (KR)

(72) Inventors: Keetae Kim, Seongnam-si (KR); Won Jo Jung, Seoul (KR); Younguk Park, Seoul (KR)

(73) Assignee: KAKAO CORP., Jeju-Si (KR)

( * ) Notice: Subject to any disclaimer, the term of this patent is extended or adjusted under 35 U.S.C. 154(b) by 18 days.

(21) Appl. No.: 14/327,681

(22) Filed: Jul. 10, 2014

(65) Prior Publication Data

US 2015/0235383 A1 Aug. 20, 2015

(30) Foreign Application Priority Data

Feb. 14, 2014 (KR) .......................... 10-2014-0017173

(51) Int. Cl.
*G06T 7/60* (2006.01)
*G06K 9/00* (2006.01)
(52) U.S. Cl.
CPC ............. *G06T 7/60* (2013.01); *G06K 9/00671* (2013.01); *G06T 2207/30184* (2013.01)
(58) Field of Classification Search
None
See application file for complete search history.

(56) References Cited

U.S. PATENT DOCUMENTS

| 6,222,583 | B1 * | 4/2001 | Matsumura | ........ | G01C 21/3635 |
| | | | | | 345/619 |
| 7,382,399 | B1 * | 6/2008 | McCall | ................ | H04N 5/2254 |
| | | | | | 348/207.99 |

FOREIGN PATENT DOCUMENTS

| JP | 2009-163504 | 7/2009 |
| KR | 10-2009-0123442 | 2/2009 |
| KR | 10-2013-0127822 | 11/2013 |

OTHER PUBLICATIONS

Tsai et al., "Feature Positionion on Google Street View Panoramas", ISPRS Annals of the Photogrammetry, Remote Sensing and Spatial Information Sciences, vol. 1-4, 2012, 5 pages.

* cited by examiner

*Primary Examiner* — David F Dunphy
(74) *Attorney, Agent, or Firm* — Mayer Brown LLP; Hyunho Park

(57) ABSTRACT

Disclosed is a device for constructing image database, including: an image input unit for receiving an image; and a building identification unit configured to map the image to a three-dimensional map based on photographing information of the image, to project direction vectors toward respective locations of the image that are mapped to the three-dimensional map from a photographing position of the image, and to distinguish buildings from the image based on whether the respective direction vectors collide or not.

13 Claims, 13 Drawing Sheets

IMAGE DATABASE CONSTRUCTING METHOD AND DEVICE USING THE SAME

CROSS-REFERENCE TO RELATED APPLICATION

This application claims priority to and the benefit of Korean Patent Application No. 10-2014-0017173 filed in the Korean Intellectual Property Office on Feb. 14, 2014, the entire contents of which are incorporated herein by reference.

BACKGROUND (a) Field

The present invention relates to an image database constructing method and a device using the same.

(b) Description of the Related Art

An image search service refers to a service for searching similar images or related information in an image database when there is an input of a query image.

In such an image search service, it is very important to construct the image database.

Particularly, as for a service for searching buildings, various information of buildings needs to be stored in the image database.

Referring to FIG. 1, conventional image databases are constructed using point clouds, which are collected by additional sensors such as RiDAR (Light Detection And Ranging) and the like.

However, referring to FIG. 2, using sensor data such as the point clouds rather than an image, a building area may be distinguished but it is impossible to acquire building information from the point clouds.

Thus, because a user cannot distinguish the building from the building areas that are divided based on the point clouds, there is a limitation that the user has to map specific information of the building to the building area by himself.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an image database constructing method and a device using the same for constructing an image database by mapping a three-dimensional map including building information with an image and projecting direction vectors from a photographing position toward each location of an image that is mapped into a three-dimensional map.

An exemplary embodiment of the present invention provides an image database constructing device, including: an image input unit for receiving an image; and a building identification unit configured to map the image to a three-dimensional map based on photographing information of the image, to project direction vectors toward respective locations of the image that are mapped to the three-dimensional map from a photographing position of the image, and to distinguish buildings from the image based on whether the respective direction vectors collide or not.

The building identification unit may determine, if a first direction vector projected to a first location of the image collides with a three-dimensional object, the first location as a building area.

The building identification unit may assign, if the first direction vector collides with the three-dimensional map including building information, the building information corresponding to the collided location to the first location.

The building identification unit may extract building area from the image based on whether the direction vectors projected to the image collide or not, and partitions the building area into several buildings based on the building information of the respective locations included in the building area.

The building identification unit may group some locations assigned with first building information in the building area, and distinguishes the some locations as the first building.

The image database constructing device may further include a building information mapper for respectively mapping building-specific information of the corresponding buildings to the building area that is partitioned by the building identification unit.

The building information may be a building identifier of the three-dimensional building with which the first direction vector collides.

The building identification unit may project the direction vectors into respective pixels of the image.

The photographing information of the image may include photographing position information and azimuth information.

An exemplary embodiment of the present invention according to an exemplary embodiment of the present invention provides an image database constructing method, including: mapping an image into a three-dimensional map based on photographing information of an image; projecting direction vectors from a photographing position of the image to respective locations of the image that are mapped into the three-dimensional map; and distinguishing buildings from the image based on whether the respective direction vectors collide or not.

The distinguishing the buildings from the image may determine, if a first direction vector projected to a first location of the image collides with a three-dimensional object, the first location as a building area, and determine, if a second direction vector projected to a second location of the image does not collide with the three-dimensional object, the second location as a non-building area.

The distinguishing the building from the image may assign, if the first direction vector collides with a first building of the three-dimensional map, a building identifier of the first building to the first location and distinguish locations assigned with the building identifier of the first building as the first building, and the three-dimensional map may be a map in which the building identifiers of the corresponding buildings are mapped to every building.

The image database construction method may further include mapping building-specific information of the first building to an area that is distinguished as the first building in the image.

The projecting the direction vectors may project the direction vectors to respective pixels of the image.

According to the exemplary embodiment of the present invention, the building areas may be differentiated and the buildings included in the building areas may be distinguished.

Therefore, according to the exemplary embodiment of the present invention, the user may automatically map the building areas and the building information even without an additional input of the building-specific information about the building.

DETAILED DESCRIPTION

Figure 1:
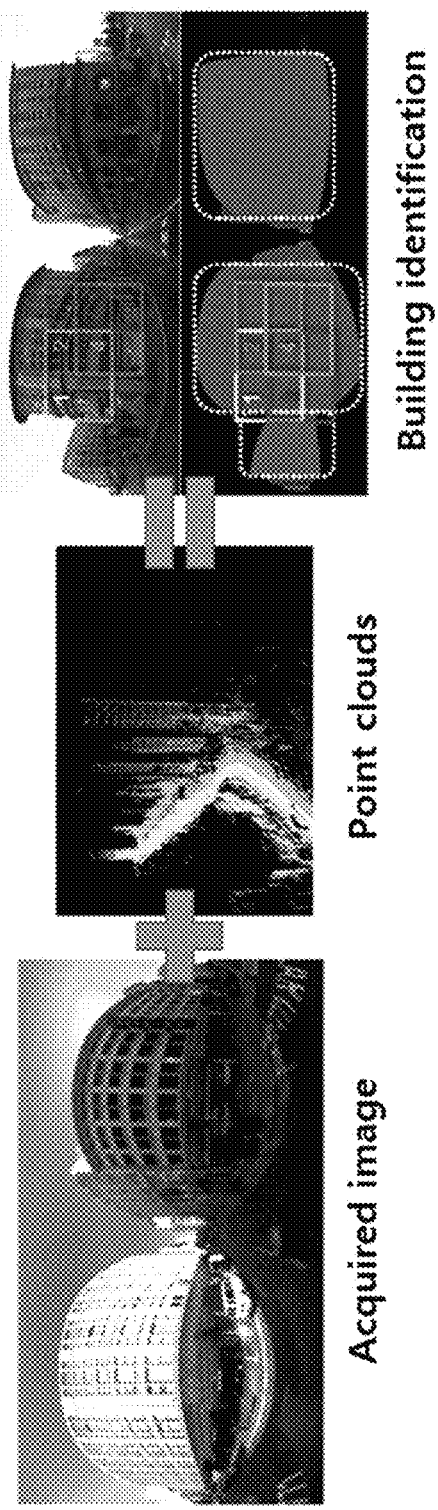
FIGS. 1 and 2 are drawings for illustrating a conventional image database constructing method.
Figure 2:
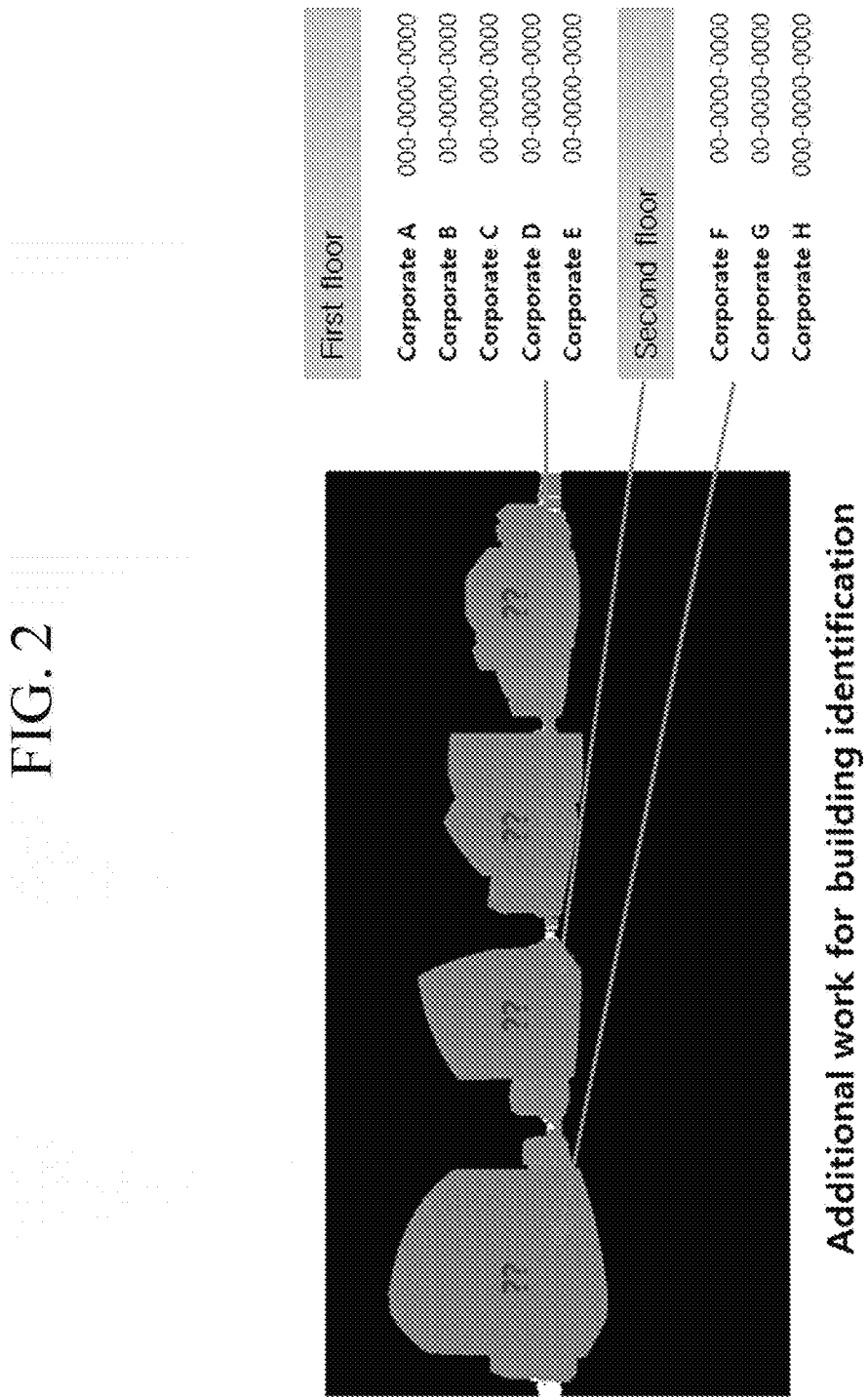

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation, and can be implemented by hardware components or software components and combinations thereof.

The words used in the specification such as "image" or "photographed image" refers to things photographed by a camera, and the words such as "photograph", "photographed image", and "road view image" may also be used to mean the same things.

Figure 3:
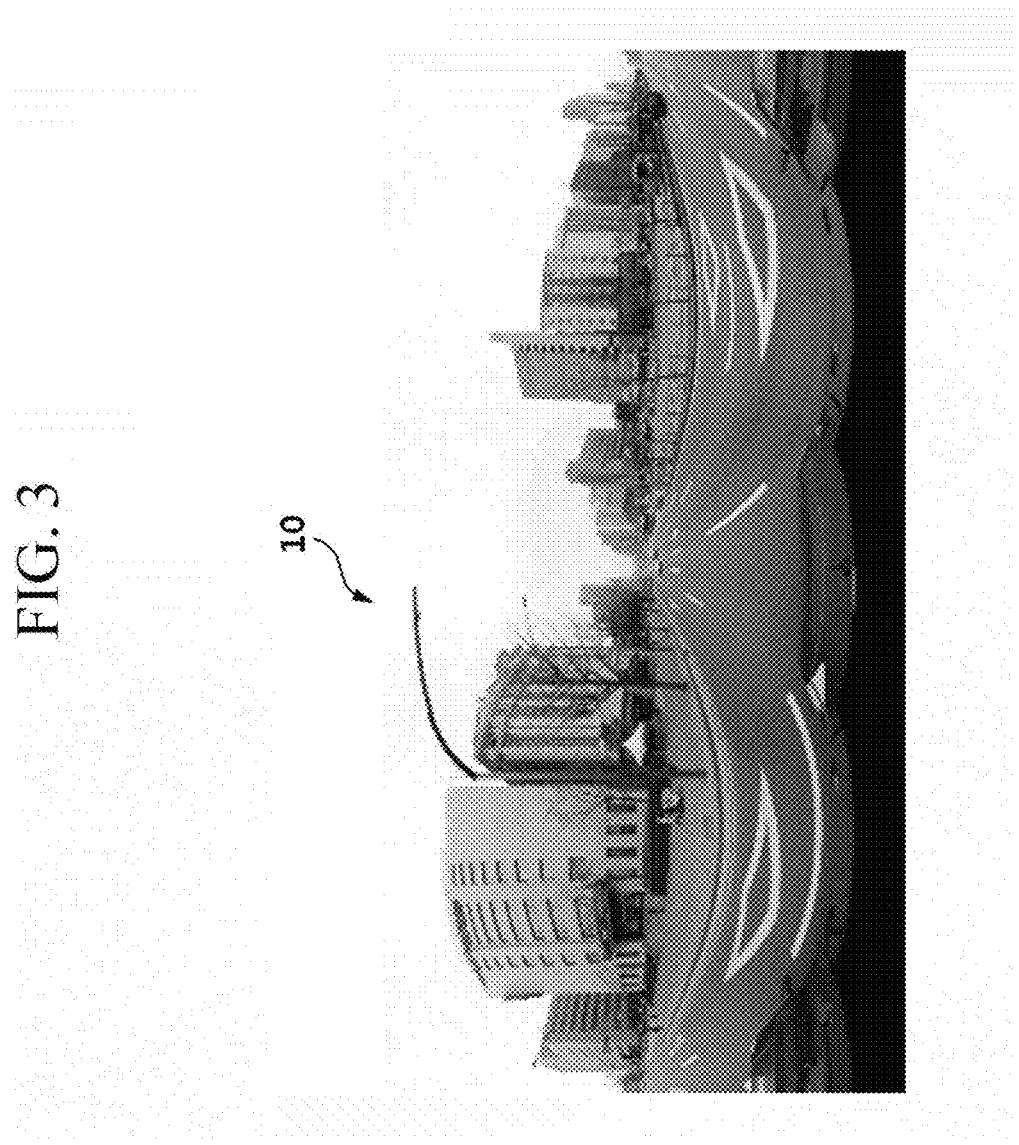
FIG. 3 is a drawing exemplarily illustrating a road view image according to an exemplary embodiment of the present invention.
Figure 4:
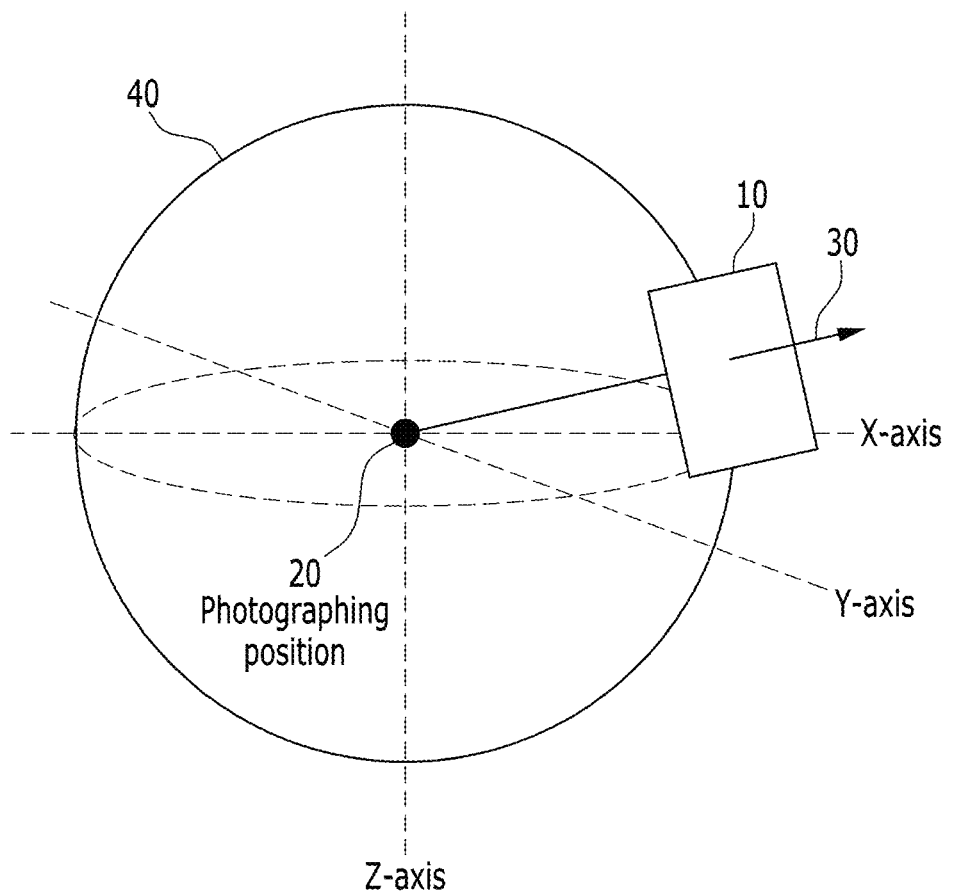
FIG. 4 is a drawing to describe a three-dimensional road view image according to the exemplary embodiment of the present invention.

FIG. 3 is a drawing exemplarily illustrating a road view image according to an exemplary embodiment of the present invention, and FIG. 4 is a drawing to describe a three-dimensional road view image according to the exemplary embodiment of the present invention.

Referring to FIG. 3, a road view service refers to a service in which images for streets everywhere are photographed using a vehicle and are connected in a panorama form, thereby enabling users to view the actual images.

As such, services for enabling the users to view the actual images may be named and serviced in various ways, for example, as a road view service, a street view service, and so on, and the present invention is not limitedly applicable to specific kinds of services.

A means of transportation such as a vehicle is mounted with a photographing device and photographs its surroundings by a predetermined distance to acquire street images.

The photographing device may include at least one camera, a GPS device for receiving location information of the camera, at least one sensor for measuring posture information of the camera, etc.

As a sensor for measuring posture of the camera, the sensor may measure azimuth information. For example, the sensor may include an angular speed sensor, a gyro sensor, an acceleration sensor, etc.

The azimuth information may reveal to which direction the camera has been directed and at which slope the camera has photographed.

In addition, the photographing device uses a position measuring device such as GPS devices and the like so as to measure a three-dimensional position (photographing position) of a photographing spot.

The photographing device photographs a certain spot and acquires an image 10.

Then, the image 10 is stored together with photographing information.

Herein, the photographing information includes photographing position information and azimuth information.

Because a representative image including the photographing information is a road view image, the road view image is exemplarily described, but the present invention is not limitedly applicable to specific kinds of images.

Referring to FIG. 4, the image 10 includes the azimuth information.

Thus, the image 10 may be positioned in a three-dimensional sphere 40 based on the azimuth information while being centered on a photographing position 20.

In this case, a photographing direction of the image 10 may be expressed as a direction vector 30 corresponding to the azimuth information. Such a sphere-shaped three-dimensional space may be referred to as a road view bubble.

A road view service-providing device (not shown) may construct a three-dimensional sphere-shaped space by connecting road view images that are photographed in a single position.

Thus, a size of the three-dimensional space where any road view image is positioned is determined by the camera that photographs the corresponding road view image. The road view image is photographed by a camera with a special lens such as a fish-eye lens and can express a fixed angle range at the photographing position in a globular form. Accordingly, the road view image may be disposed within the sphere. To illustrate in FIG. 3, the road view image 10 is simply shown as if it borders on the sphere, but the road view image 10 may be positioned to enclose the sphere.

If a general image photographed by a normal camera is used, the general image may be converted, based on the photographing information including the camera information, into a globular image such that the present invention is applicable thereto.

An image database constructing method will now be described in detail using an image database constructing device.

Figure 5:
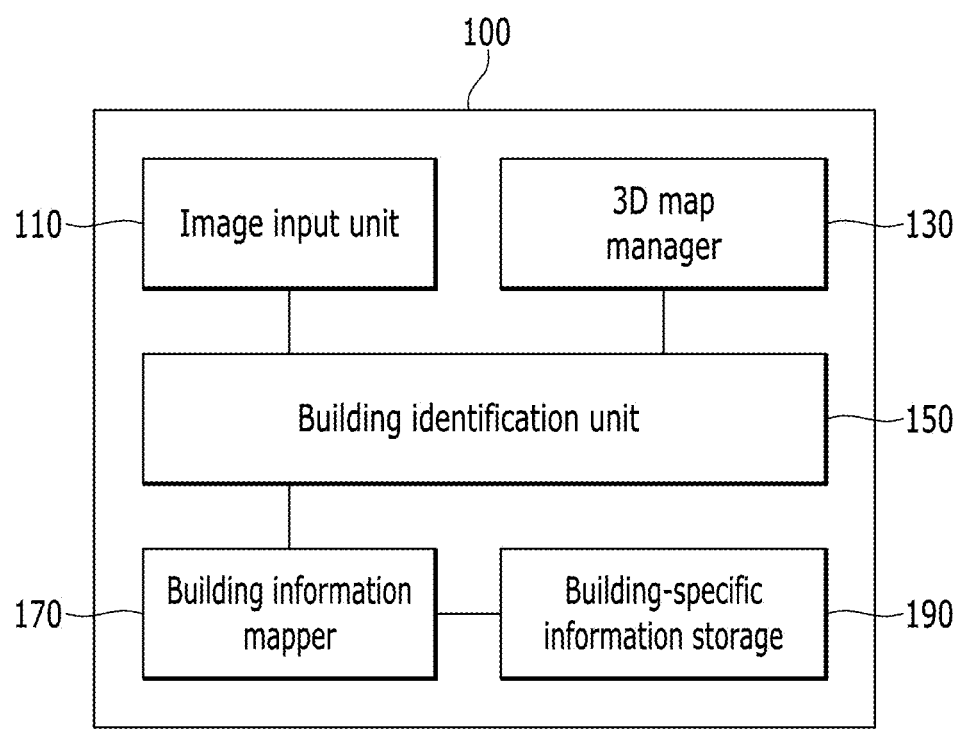
FIG. 5 is a block diagram of an image database constructing device according to the exemplary embodiment of the present invention.
Figure 6:
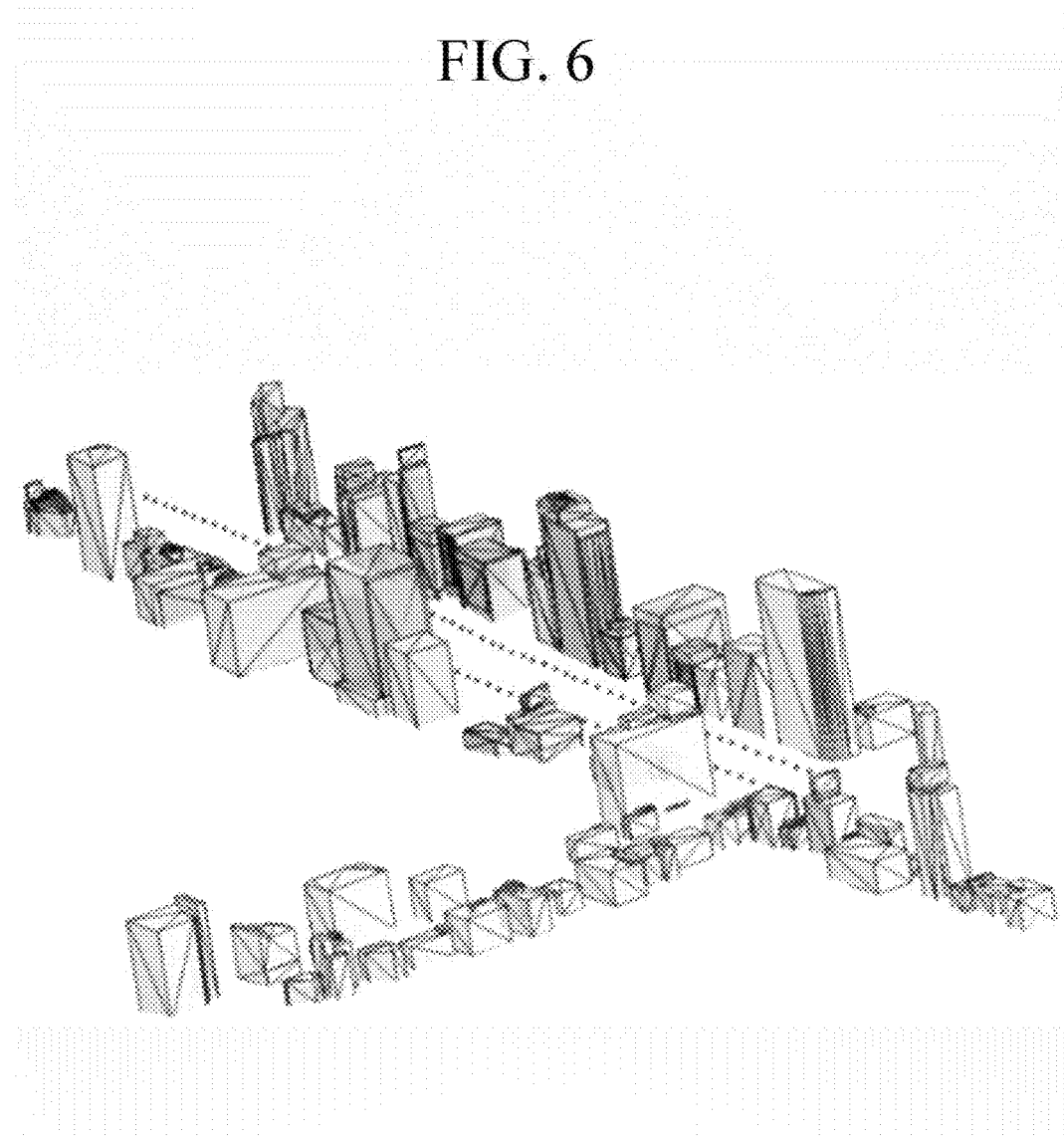
FIG. 6 is a drawing illustrating a three-dimensional map according to the exemplary embodiment of the present invention.
Figure 7:
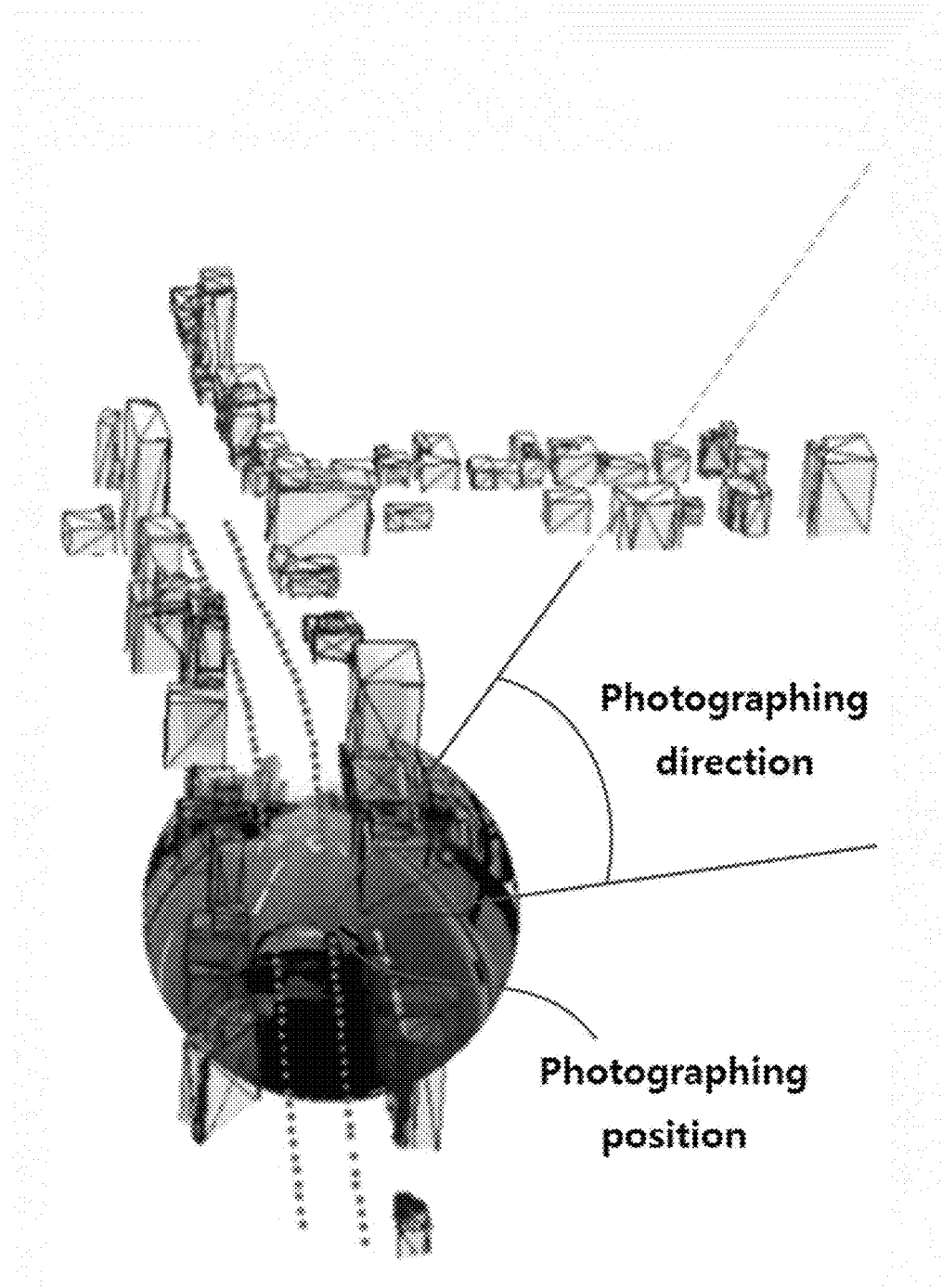
FIG. 7 is a drawing illustrating mapping of the three-dimensional map with the image.

FIG. 5 is a block diagram of an image database constructing device according to the exemplary embodiment of the present invention, FIG. 6 is a drawing illustrating a three-dimensional map according to the exemplary embodiment of the present invention, FIG. 7 is a drawing illustrating mapping of the three-dimensional map with the image, and FIGS. 8 to 11 are drawings illustrating a vector collision method according to an exemplary embodiment of the present invention.

Referring to FIG. 5, an image database constructing device 100 constructs an image database for managing various kinds of image-related information.

The image database constructing device 100 includes an image input unit 110, a three-dimensional map manager 130, a building identification unit 150, and a building information mapper 170.

The image database constructing device 100 may further include a building-specific information storage 190.

The image input unit 110 receives the images that are photographed by the camera.

Each image includes the photographing position information and the azimuth information.

The image may be the road view image.

The three-dimensional map manager 130 manages the three-dimensional maps.

The three-dimensional map manager 130 may provide a three-dimensional map around a specific location according to a request of the building identification unit 150.

The three-dimensional map includes a position on the map and building information.

Herein, the building information includes a building identifier and may further include building-specific information about each building.

The building identifier refers to information such as a building name, a building ID, an address, etc. with which each building can be identified.

The three-dimensional map manager 130 may create the three-dimensional map or receive the three-dimensional map that is previously created.

The three-dimensional map may be created in various ways, and for example, a building is erected in a two-dimensional planar map according to height information of each building to create a three-dimensional map like FIG. 6.

The building identification unit 150 maps the image inputted to the image input unit 110 to the three-dimensional map.

The building identification unit 150 may locate the image in the three-dimensional space based on the photographing information of the image.

Specifically, the building identification unit 150 searches a spot corresponding to the photographing position of the image 10 in the three-dimensional map, as shown in FIG. 7, and may position the sphere 40 related to the image 10 in the spot.

In order to request the three-dimensional map related to the image 10, the building identification unit 150 may set a predetermined radius from the photographing position such that the buildings contained in the image 10 are included.

Further, the building identification unit 150 may ask the three-dimensional map manager 130 for the three-dimensional map, which corresponds to the predetermined radius from the photographing position.

Figure 8:
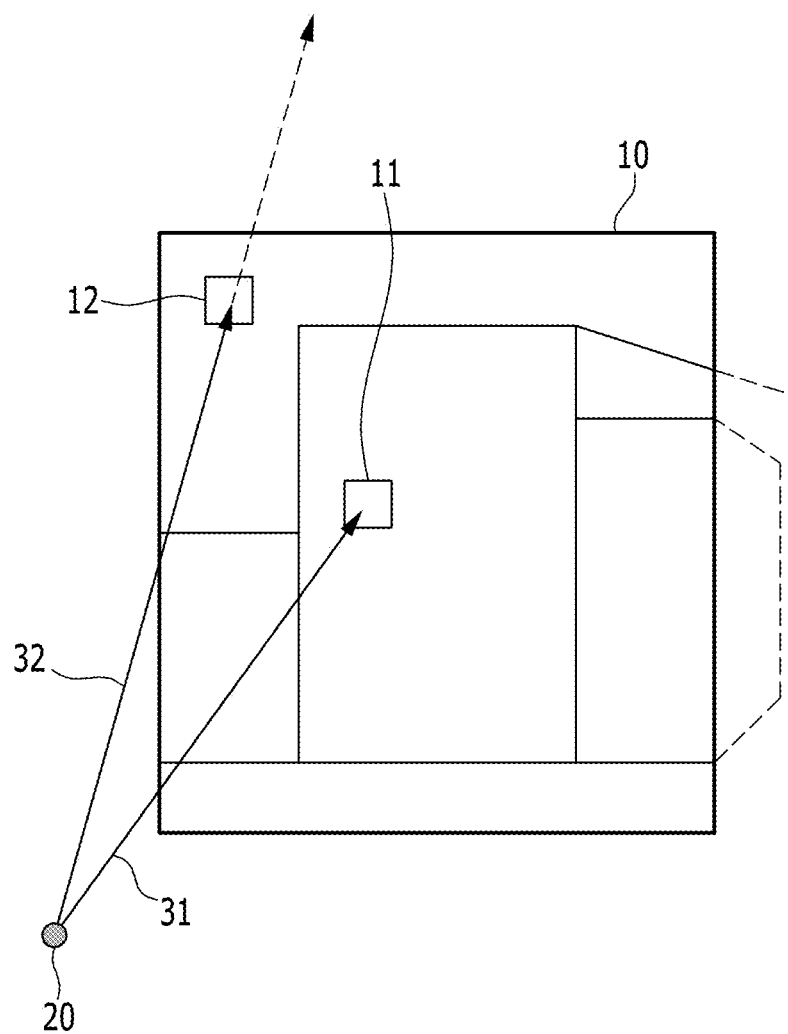
FIGS. 8 to 11 are drawings illustrating a vector collision method according to an exemplary embodiment of the present invention.
Figure 9:
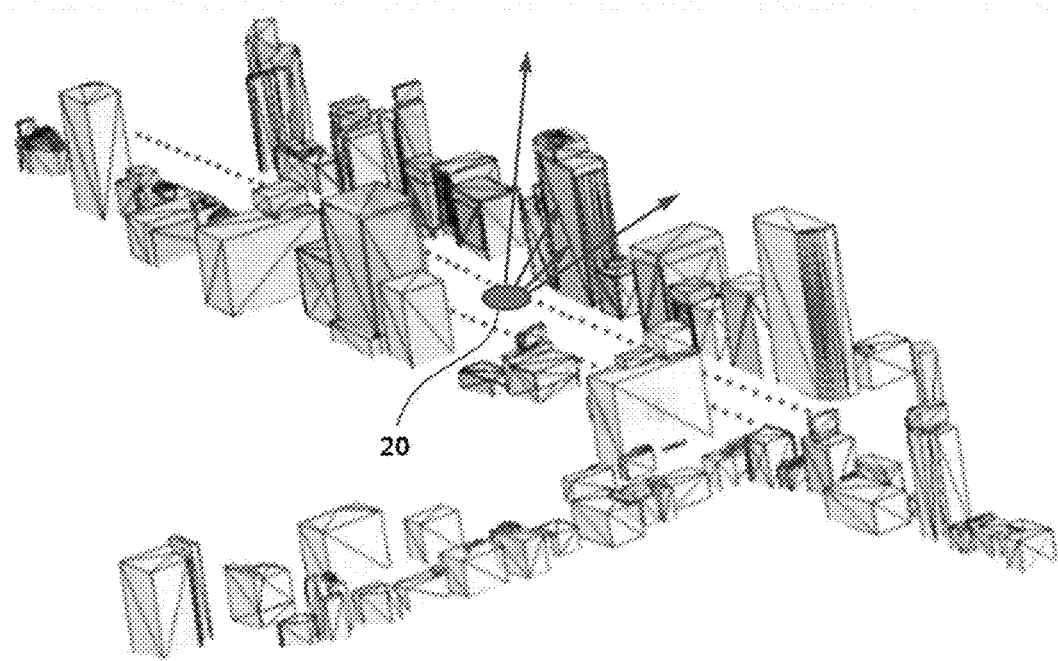

Referring to FIGS. 8 and 9, the building identification unit 150 projects direction vectors (rays) toward respective locations of the image 10, which are mapped to the three-dimensional map, from the photographing position 20 of the image 10.

The direction vectors are directed toward the respective locations from the photographing position 20 of the image 10, and starting points and directions of the vectors are calculated based on the photographing information of the image 10.

The image 10 positioned in three dimensions, as shown in FIG. 4, may be mapped to the three-dimensional map.

Thus, a certain point of the image 10 may be mapped with an object such as a building.

In this case, the direction vector is projected from the photographing position 20 toward a spot where the building is mapped and then collides with the three-dimensional building.

That is, the building identification unit 150 projects a direction vector 31 from the photographing position toward a certain location 11 of the image 10, and determines the location 11 as the building area if the direction vector 31 collides therewith.

Further, the building identification unit 150 searches information about the object (building) with which the direction vector 31 collides, for example, the building identifier, and assigns the building identifier to the location 11 of the image 10.

As such, the building identification unit 150 differentiates the location 11 as the building area, and simultaneously distinguishes the building therefrom.

If a certain location 12 of the image 10 is a sky, there is no mapped object like the building in the location 12.

Thus, even if the building identification unit 150 projects direction vectors 32 from the photographing position toward the location 12, the direction vectors 32 do not collide.

As such, the building identification unit 150 determines that the location 12 of the image 10 is not the building area.

The building identification unit 150 differentiates the image 10 by respective pixels, and projects the direction vectors to the respective pixels to collect the building information of the entire image.

Such a method may be referred to as a vector collision method or a ray intersection method.

Figure 10:
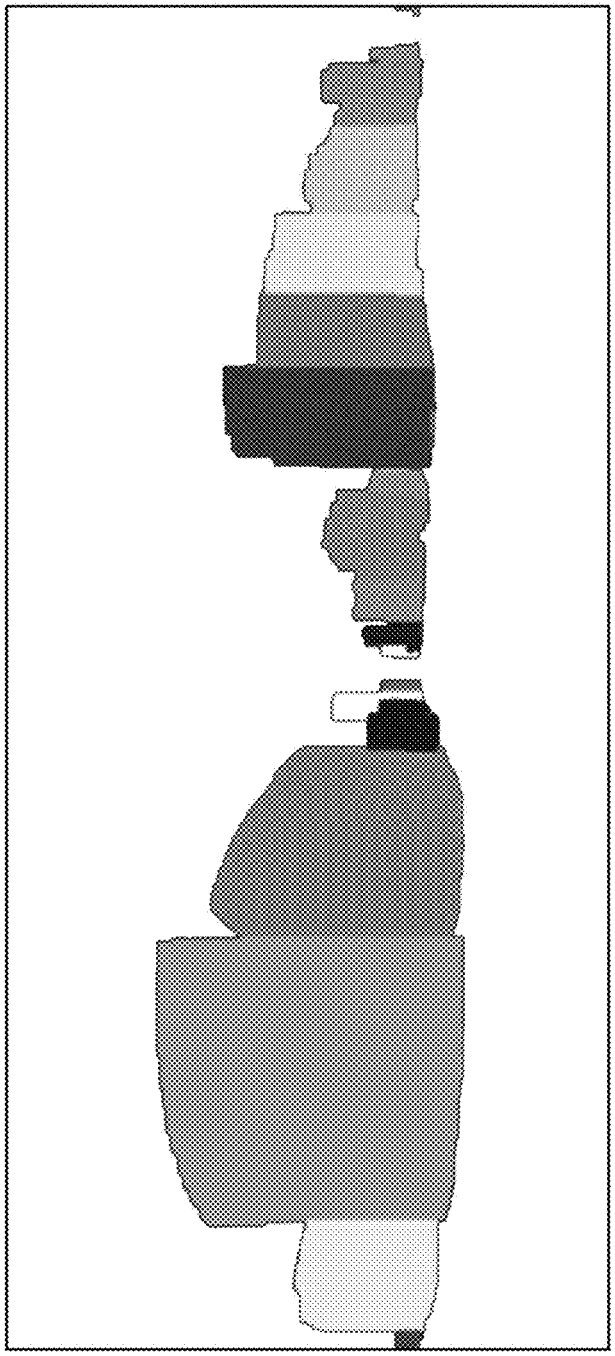
Figure 11:
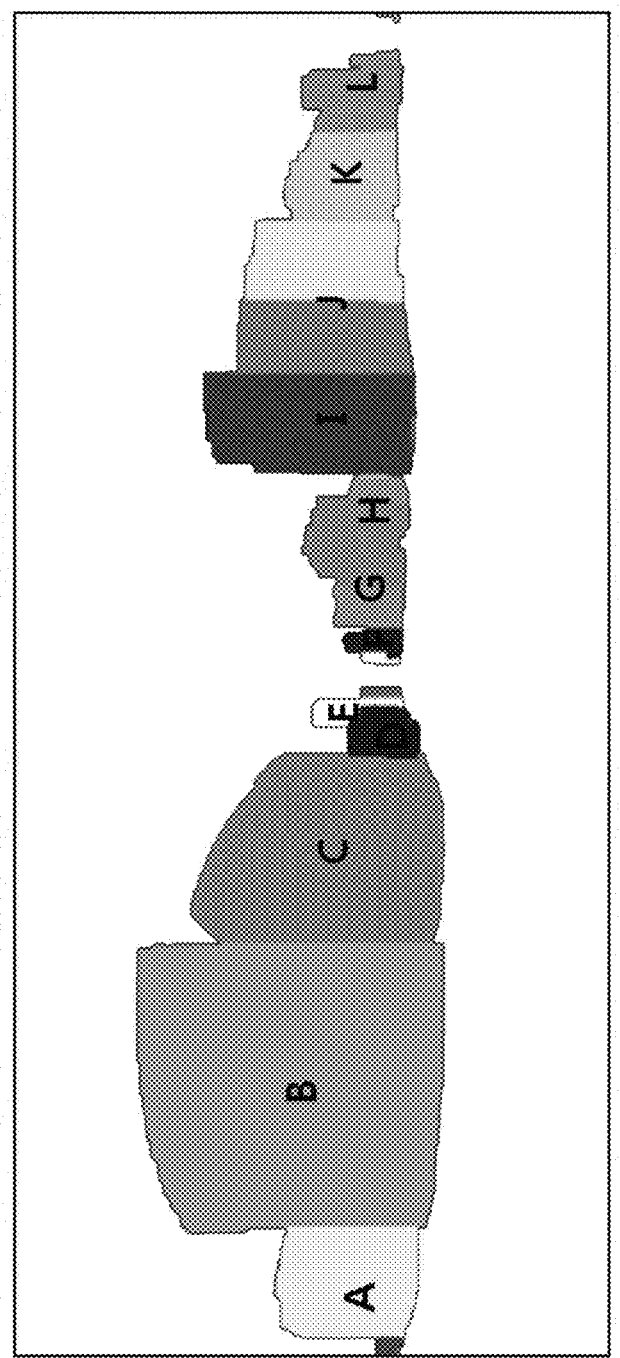

Referring to FIGS. 10 and 11, the building identification unit 150 projects the direction vectors toward respective locations of the image 10 from the photographing position so as to extract the building area.

The building identification unit 150 may group the locations with the same building identifier (for example, A, B, C, . . . , K, L) in the image 10 to partition the corresponding building area as separate buildings.

Further, the building identification unit 150 may differentiate the building area based on the building identifiers assigned to the partitioned building areas and distinguish the portioned building areas from one another.

The building information mapper 170 maps building-specific information to each of the buildings that are differentiated by the building identification unit 150.

The building information mapper 170 stores the differentiated building in the image and the building-specific information mapped to the differentiated building in the image database (not shown).

The building-specific information storage 190 stores the building-specific information corresponding to the building identifier.

The building-specific information includes various kinds of information about the building such as a building name, a building location, floors, contact information, store information on each floor, etc.

Figure 12:
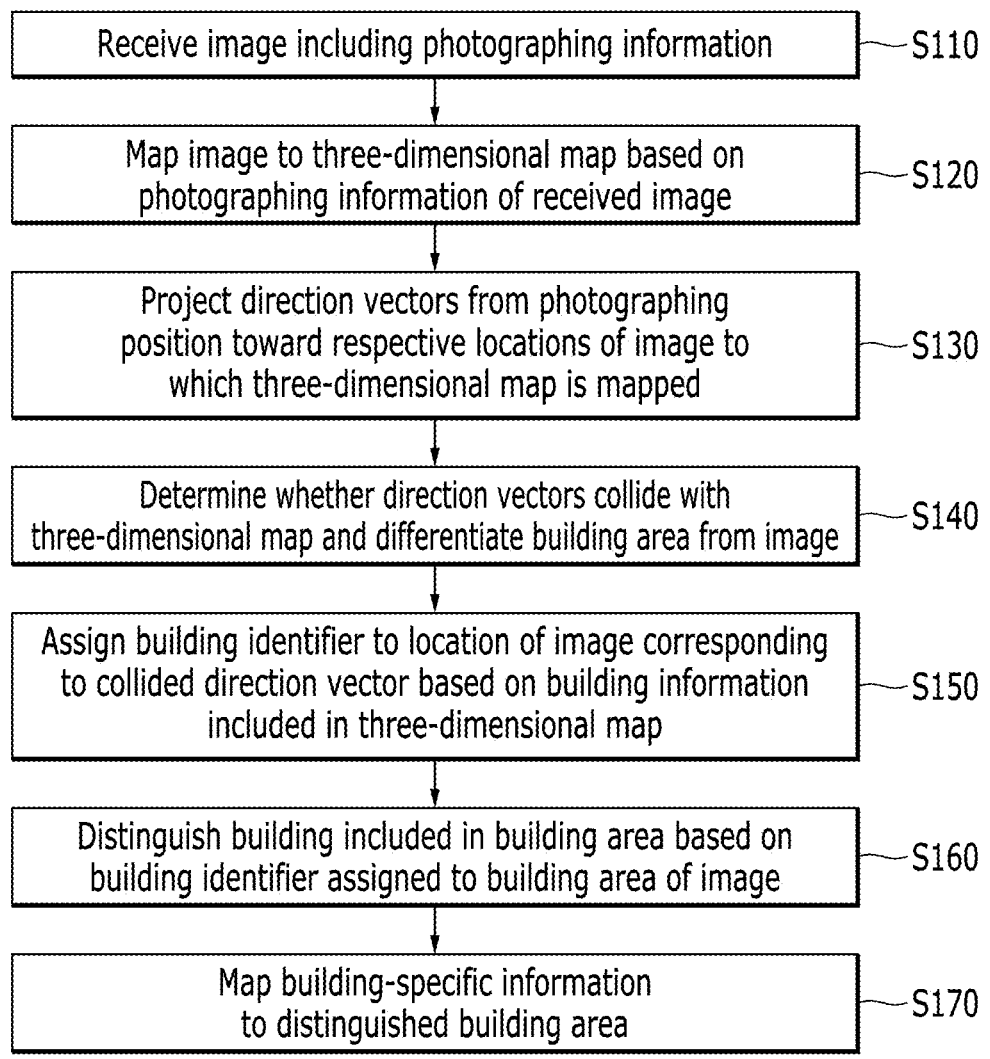
FIG. 12 is a flowchart of an image database constructing method according to the exemplary embodiment of the present invention.
Figure 13:
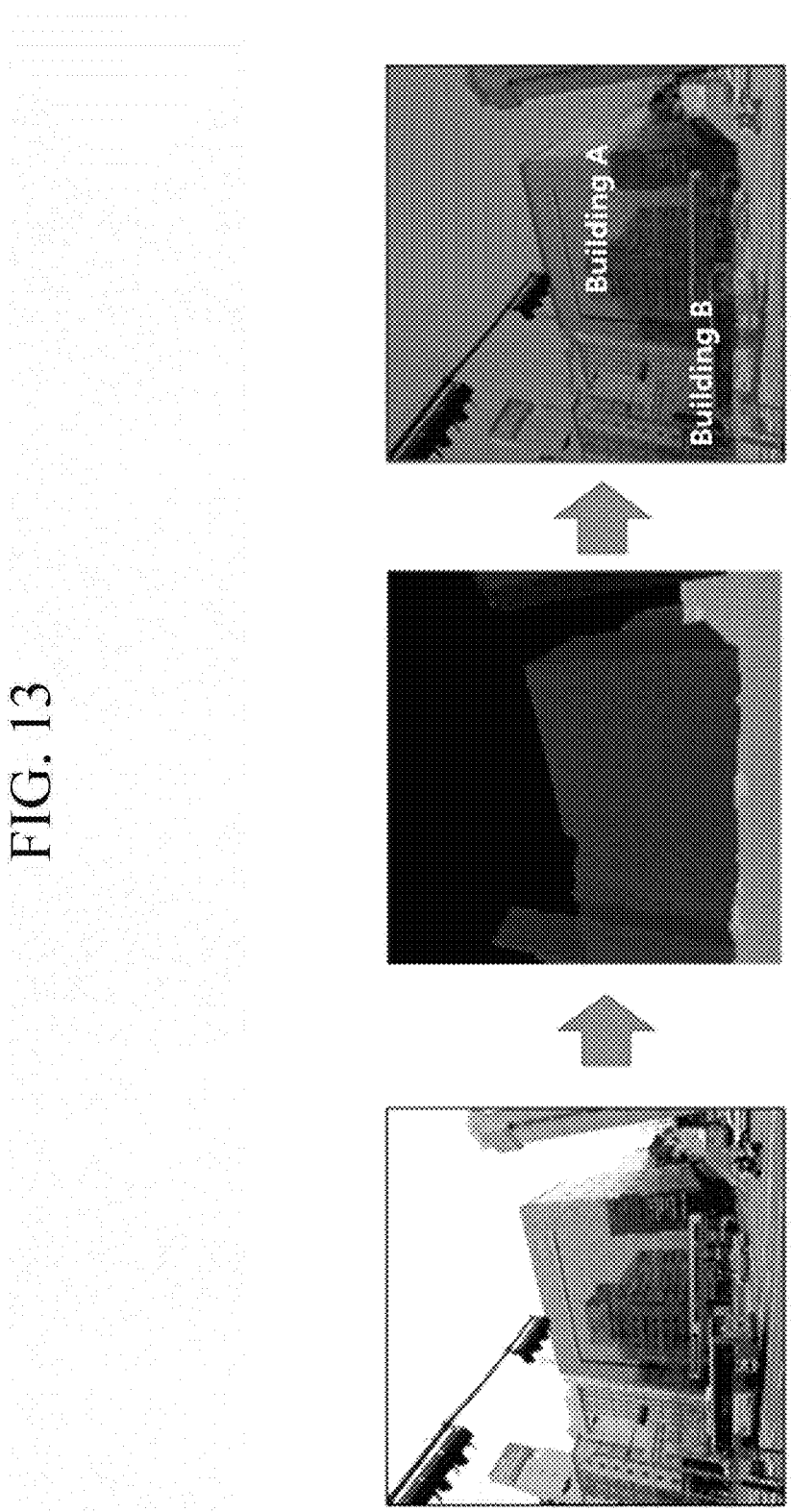
FIG. 13 is a drawing exemplarily illustrating the image database constructing method according to the exemplary embodiment of the present invention.

FIG. 12 is a flowchart of an image database construction method according to an exemplary embodiment of the present invention, and FIG. 13 is a drawing exemplarily illustrating the image database construction method according to the exemplary embodiment of the present invention.

Referring to FIG. 12, the image database constructing device 100 receives an image including photographing information (S110).

The photographing information includes photographing position information and azimuth information.

The image database constructing device 100 maps the image to the three-dimensional map based on the photographing information of the received image (S120).

The three-dimensional map may include a position on the map and building information.

In this case, the building information includes a building identifier, and may further include building specific information about each building.

The image database constructing device 100 projects direction vectors from the photographing position toward respective locations of the image to which the three-dimensional map is mapped (S130).

Sizes of the locations in the image toward which the direction vectors are projected may be variously modified according to methods for differentiating the image.

For example, the image database constructing device 100 may divide the image into respective pixels and project the direction vectors to all of the pixels.

The image database constructing device 100 determines whether the direction vectors collide with the three-dimensional map and differentiates the building area from the image (S140).

If a direction vector-A collides, the image database constructing device 100 determines the point of the image to which the direction vector-A is directed as the building area, and otherwise, determines the point of the image as a vacant area like a sky.

Referring to FIG. 9, the image database constructing device 100 projects the direction vectors to every point of the image and determines whether each direction vector collides with the three-dimensional object, thereby differentiating the building area from the non-building area (sky, road, etc.) in the image.

The image database constructing device 100 assigns the building identifier to the location of the image corresponding to the collided direction vector based on the building information included in the three-dimensional map (S150).

That is, if the direction vector directed toward a location of the image collides with the three-dimensional map, the image database constructing device 100 searches the building identifier of the building with which the direction vector collides and assigns the building identifier to the location of the image.

The image database constructing device 100 distinguishes the building included in the building area based on the building identifier that is assigned to the building area of the image (S160).

Referring to FIG. 13, the image database constructing device 100 may distinguish the building area into two buildings (building A and building B).

The image database constructing device 100 maps the building-specific information to the distinguished building area (S170).

The image database constructing device 100 respectively maps the building-specific information to every building included in the image, and stores such information in the image database.

As described above, according to the exemplary embodiment of the present invention, the building areas may be differentiated and the buildings included in the building area may be distinguished.

Therefore, according to the exemplary embodiment of the present invention, the user may automatically map the building-specific information to the distinguished building even without additional input of the building-specific information about the building.

The above-describe embodiments are implemented not only through an apparatus and a method, but also through a program for executing the functions corresponding to the configuration of the embodiments of the present invention or a recording medium having the program therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image database constructing device for constructing image database, comprising:
    an image input unit for receiving a photographed image with photographing information of the image; and
    a building identification unit configured to:
        construct a three-dimensional sphere from at least one photographed image,
        identify a spot corresponding to a photographing position of the photographed image in a three-dimensional map, and set the three-dimensional sphere in the spot of the three-dimensional map based on the photographing information of the photographed image,
        map the photographed image to the three-dimensional map based on the three-dimensional sphere and the photographing information of the photographed image to create a three-dimensionally mapped image,
        project direction vectors toward respective locations of the three-dimensionally mapped image from the photographing position of the three-dimensionally mapped image,
        determine whether the direction vectors collide with a location in the three-dimensionally mapped image,
        assign an identifier to a location that is collided with the direction vectors and distinguish a building from the location in the three-dimensionally mapped image based on the identifier, and
        determine, if a first direction vector projected to a first location of the photographed image collides with a three-dimensional object of the three-dimensional map, the first location as a building area.

2. The device of claim 1, wherein the building identification unit is further configured to assign, if the first direction vector collides with the three-dimensional map including building information, the building information corresponding to the collided location to the first location.

3. The device of claim 2, wherein the building identification unit is further configured to:
    extract the building area from the mapped image based on the determination, and
    partition partitions the building area into several buildings based on the building information of the respective locations included in the building area.

4. The device of claim 3, wherein the building identification unit is further configured to:
    group locations assigned with a first building identifier in the building area, and
    distinguish the locations as a first building.

5. The device of claim 3, further comprising
a building information mapper configured to map building-specific information of the buildings to the building area that is partitioned by the building identification unit.

6. The device of claim 2, wherein the building information is a building identifier of the three-dimensional building with which the first direction vector collides.

7. The device of claim 1, wherein the building identification unit is further configured to project the direction vectors into respective pixels of the photographed image.

8. The device of claim 1, wherein the photographing information of the photographed image includes photographing position information and azimuth information.

9. An image database constructing method using an image database constructing device, comprising:
receiving a photographed image with photographing information of the image;
construct a three-dimensional sphere from at least one photographed image,
identifying a spot corresponding to a photographing position of the photographed image in a three-dimensional map, and setting the three-dimensional sphere in the spot of the three-dimensional map based on the photographing information of the photographed image;
mapping the photographed image into the three-dimensional map based on the photographing information of the photographed image and the three-dimensional sphere to create a three-dimensionally mapped image;
projecting direction vectors from the photographing position of the three-dimensionally mapped image to respective locations of the three-dimensionally mapped image;
determining whether the direction vectors collide with a location in the three-dimensionally mapped image;
assigning an identifier to a location that is collided with the direction vectors; and
distinguishing a building from the location in the three-dimensionally mapped image based on the identifier,
determining, if a first direction vector projected to a first location of the photographed image collides with a three-dimensional object of the three-dimensional map, the first location as a building area.

10. The method of claim 9, wherein distinguishing the building from the location in the three-dimensionally mapped image comprises determining, if a first direction vector projected to a first location of the photographed image collides with a three-dimensional object, the first location as a building area and determining if a second direction vector projected to a second location of the image does not collide with the three-dimensional object, the second location as a non-building area.

11. The method of claim 10, wherein the distinguishing the building from the location in the three-dimensionally mapped image assigns, if the first direction vector collides with a first building of the three-dimensional map, a building identifier of the first building to the first location and distinguishes locations assigned with the building identifier of the first building as the first building, and the three-dimensional map is a map in which the building identifiers of the corresponding buildings are mapped to every building.

12. The method of claim 11, further comprising
mapping building-specific information of the first building to an area that is distinguished as the first building in the image.

13. The method of claim 9, wherein the projecting the direction vectors projects the direction vectors to respective pixels of the photographed image.

* * * * *